(12) United States Patent  
Yamanaka

(10) Patent No.: US 7,503,239 B2
(45) Date of Patent: Mar. 17, 2009

(54) BICYCLE CRANK ARM ASSEMBLY

(75) Inventor: Masahiro Yamanaka, Izumisano (JP)

(73) Assignee: Shimano Inc., Osaka (JP)

( * ) Notice: Subject to any disclaimer, the term of this patent is extended or adjusted under 35 U.S.C. 154(b) by 1107 days.

(21) Appl. No.: 10/354,115

(22) Filed: Jan. 30, 2003

(65) Prior Publication Data

US 2004/0149076 A1 Aug. 5, 2004

(51) Int. Cl.
  *B62M 3/00* (2006.01)
  *B25G 3/00* (2006.01)
  *F16B 7/08* (2006.01)
  *B23Q 1/48* (2006.01)

(52) U.S. Cl. .................. 74/594.1; 403/230; 403/381

(58) Field of Classification Search ..... 74/594.1–594.7; 403/381, 230; 384/537, 903; 301/2.5
See application file for complete search history.

(56) References Cited

U.S. PATENT DOCUMENTS

| | | | | |
|---|---|---|---|---|
| 3,906,811 | A * | 9/1975 | Thun | ............ 74/594.1 |
| 4,446,753 | A | 5/1984 | Nagano et al. | |
| 5,062,318 | A | 11/1991 | Yamazaki | |
| 5,315,896 | A | 5/1994 | Stringer et al. | |
| 5,440,950 | A | 8/1995 | Tranvoiz et al. | |
| 5,988,016 | A | 11/1999 | Yamanaka | |
| 6,024,662 | A | 2/2000 | Fujimoto | |
| 6,079,294 | A * | 6/2000 | Mizobe | ............ 74/594.1 |
| 6,475,110 | B1 | 11/2002 | Yamanaka | |
| 6,568,296 | B1 * | 5/2003 | Lin | ............ 74/594.1 |
| 6,692,157 | B2 * | 2/2004 | Sahashi et al. | ............ 384/537 |
| 2001/0015390 | A1 | 8/2001 | Hitomi et al. | |
| 2003/0061900 | A1 * | 4/2003 | Smith | ............ 74/594.1 |

FOREIGN PATENT DOCUMENTS

| | | |
|---|---|---|
| DE | 20202956 | 6/2002 |
| FR | 2416829 | 9/1979 |
| JP | 2395 | 2/1932 |
| JP | 60-10952 Y2 | 4/1985 |
| JP | 61-314 Y2 | 1/1986 |
| JP | 3088499 U | 6/2002 |
| WO | WO99/67125 | 12/1999 |

OTHER PUBLICATIONS

Shimano Dealer Catalog; 1984; 5 pages.
Shimano Small Parts List; 1984, 1 page.
Truvativ Catalog; 2003; 3 pages.

* cited by examiner

*Primary Examiner*—Vinh T. Luong
(74) *Attorney, Agent, or Firm*—Global IP Counselors, LLP

(57) ABSTRACT

A bicycle crank arm assembly is provided with a bicycle crank arm with a first end configured to be coupled to an axle of a bottom bracket and a second end with a pedal attachment bore for receiving a bicycle pedal shaft. A tubular member is press fitted into the bore of the bicycle crank arm. The tubular member has an external circumferential with serrations that is surface non-releasably press fitted into the pedal attachment bore of the bicycle crank arm, and an internally threaded surface adapted to be coupled to the bicycle pedal shaft. The crank arm preferably has a counterbore at one axial end of the pedal attachment bore with a washer disposed therein such that the washer partially overlaps the tubular member.

12 Claims, 11 Drawing Sheets

US 7,503,239 B2

BICYCLE CRANK ARM ASSEMBLY

BACKGROUND OF THE INVENTION

1. Field of the Invention

This invention generally relates to a bicycle crank arm assembly. More specifically, the present invention relates to a bicycle crank arm assembly having a bicycle crank arm with a pedal attachment bore that has a reinforcement member.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle as well as the frame of the bicycle. One component that has been extensively redesigned is the bicycle crank arm.

Recently, some bikers enjoy extremely hard riding in the mountains. When riding in the mountains, the various components can often become damaged. One particular component that is sometimes damaged due to such extremely hard riding in the mountains is the bicycle crank arm. Since the bicycle crank arm is rotatably coupled between a pedal and a bottom bracket, the bicycle crank arm often receives very strong external forces from the pedal when the pedal hits external objects such as rocks, trees and artificial objects. Moreover, recently, the bicycle crank arm is made of a lightweight material such as aluminum for the purpose of weight reduction. Consequently, these external forces often cause damages, such as bending and cracking of such lightweight bicycle crank arm.

Therefore, a bicycle crank arm assembly often includes a reinforcement member coupled to the bicycle crank arm at a portion where a pedal axle of the pedal is coupled thereto. This reinforcement member is usually made of a rigid metal, such as steel, to secure the rigidity of a coupling portion of the pedal and the bicycle crank arm. One example of such reinforcement members comprises a bushing member that is inserted in a pedal attachment bore of the bicycle crank arm to be coupled to the pedal axle of the pedal. This reinforcement member includes threads formed on the outer circumferential surface and the inner circumferential surface of the bushing member. The threads on the outer circumferential surface of the bushing member engage with threads on the inner surface of the pedal attachment bore of the bicycle crank arm. The threads on the inner circumferential surface of the bushing member engage with the threads of the pedal axle. In other words, the reinforcement member is threaded into the pedal attachment hole of the crank arm, while the pedal axle is threaded into the reinforcement member. However, since threads inherently have some play, the arrangement of the conventional reinforcement member increases the play of the coupling of the bicycle crank arm and the pedal axle. This play at the coupling section of the crank arm and the pedal often causes damaging of the bicycle crank arm, such as bending and cracking, when the external forces are applied to the crank arm thorough the pedal.

In view of the above, it will be apparent to those skilled in the art from this disclosure that there exists a need for an improved bicycle crank arm assembly. This invention addresses this need in the art as well as other needs, which will become apparent to those skilled in the art from this disclosure.

SUMMARY OF THE INVENTION

One object of the present invention is to provide a bicycle crank arm assembly that is lightweight yet has a strong durability in an extremely hard riding condition.

Another object of the present invention is to provide a bicycle crank arm assembly having a reinforcement member that prevents the bicycle crank arm from bending and/or cracking.

The foregoing objects can basically be attained by providing a bicycle crank arm assembly that comprises a bicycle crank arm and a tubular member. The bicycle crank arm includes a first end configured to be coupled to an axle of a bottom bracket and a second end with a bore for receiving a bicycle pedal shaft. The tubular member is press fitted into the bore of the bicycle crank arm. The tubular member has a tubular portion having an external circumferential surface being non-releasably press fitted into the bore of the bicycle crank arm and an internal circumferential surface being configured to be coupled to the bicycle pedal shaft. Serrations are formed on the external circumferential surface of the tubular portion in axial direction of the tubular portion to non-rotatably couple the tubular member within the bore of the bicycle crank arm.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
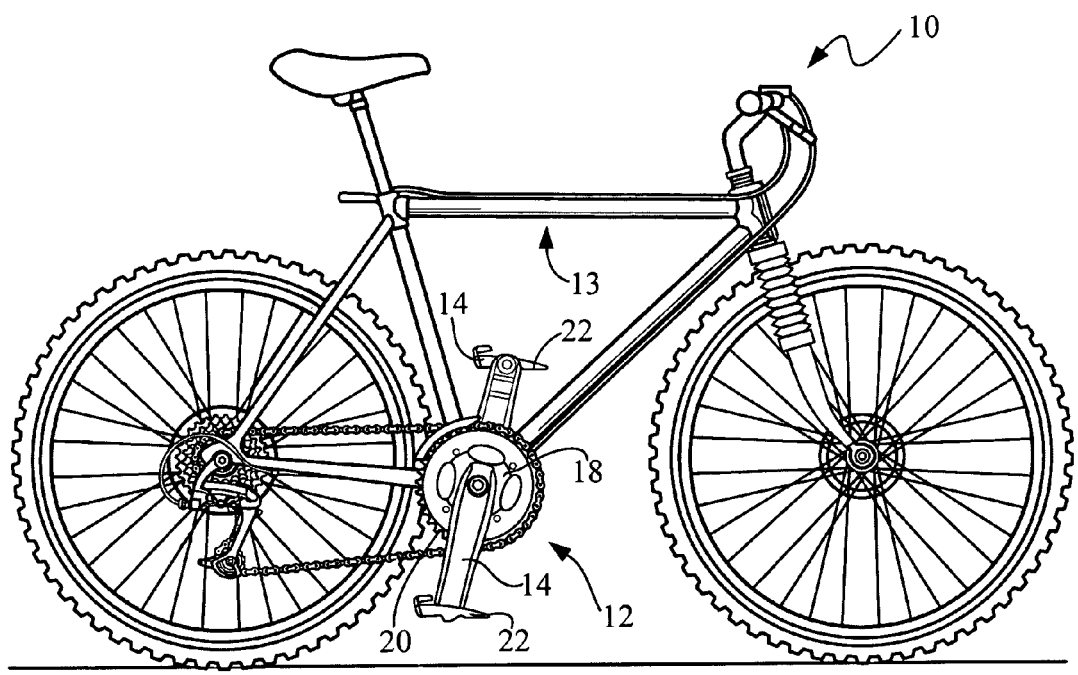
FIG. 1 is a side elevational view of a bicycle equipped with a bicycle crank set that has a pair of crank arm assemblies in accordance with one embodiment of the present invention.

Referring initially to FIG. 1, a bicycle 10 is illustrated that is equipped with a bicycle crank set 12 in accordance with one embodiment of the present invention. The bicycle 10 basically has a frame 13 with the crank set 12 coupled thereto in a conventional manner. The bicycle 10 is conventional except for selected parts of the crank set 12, as discussed below. Thus, the bicycle 10 and its various components will not be discussed or illustrated in detail herein, except for the components which relate to the present invention. In other words, only the crank set 12 will be discussed and illustrated in detail herein.

Figure 2:
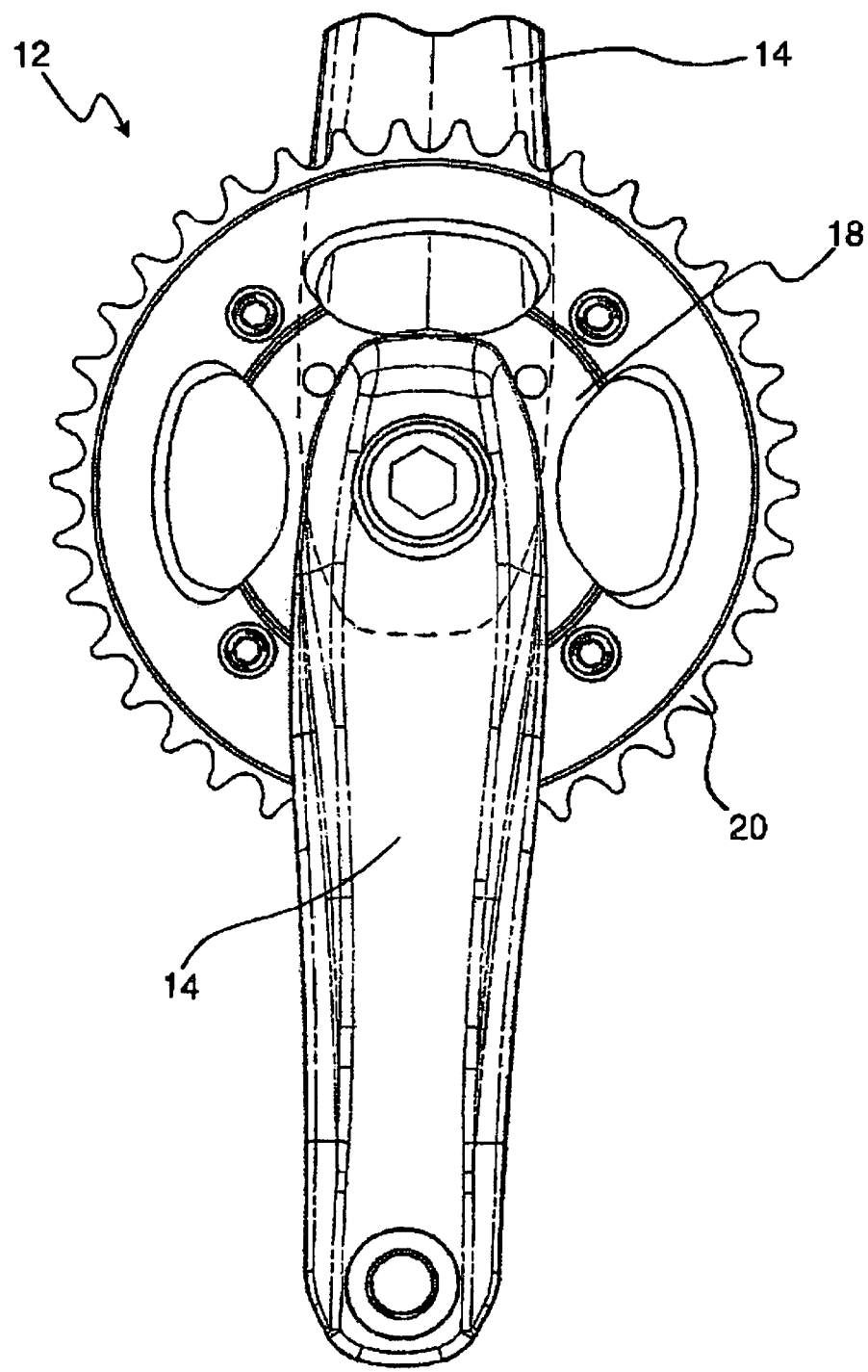
FIG. 2 shows a right side elevational view of the bicycle crank set illustrated in FIG. 1 in accordance with the present invention.
Figure 3:
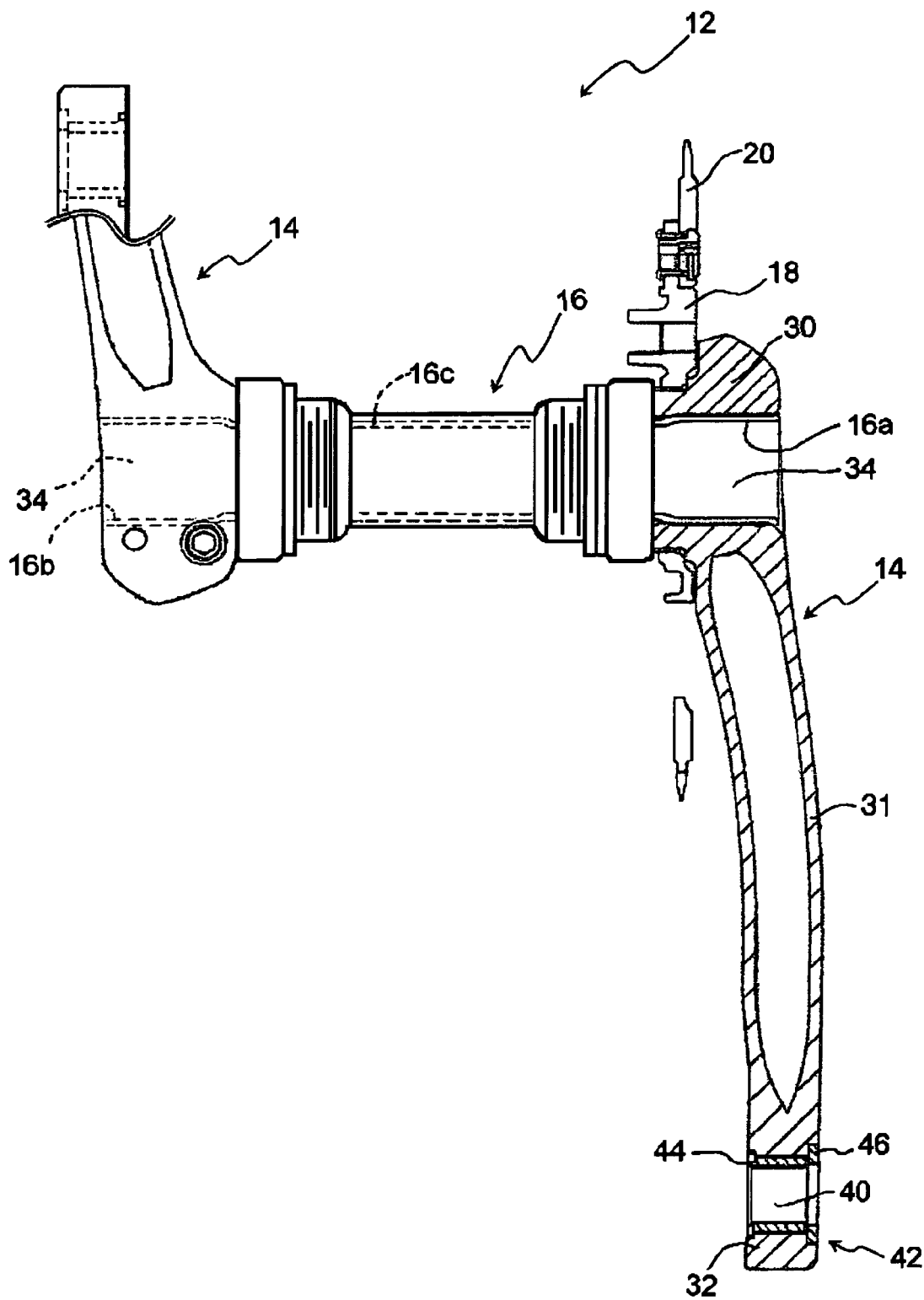
FIG. 3 is a partial rear end elevational view of the bicycle crank set illustrated in FIGS. 1 and 2 in accordance with the present invention, with only one sprocket mounted thereto and the right crank arm shown in cross section.

Basically, as seen in FIGS. 2 and 3, the crank set 12 includes a pair of crank arms 14, a bottom bracket 16, a chain ring plate 18, one or more chain rings or sprockets 20 (only one shown). The crank arm 14 is preferably made of hard yet lightweight materials such as aluminum for the purpose of weight reduction of the bicycle 10. The crank set 12 also has a pair of pedals 22 coupled thereto as explained below. The bottom bracket 16, the chain ring plate 18, the sprocket 20 and the pedals 22 are relatively conventional components that are well known in the bicycle art. Thus, these components will not be discussed or illustrated in detail herein, except to the extent needed to explain the present invention.

As seen in FIG. 3, the right and left crank arms 14 are coupled to opposite ends 16a and 16b of an axle 16c of the bottom bracket 16. Of course, it will be apparent to those skilled in the art from this disclosure that there are minor differences in the attachment structures of the right and left crank arms 14 where they are attached to the axle 16c of the bottom bracket 16. Moreover, it will be apparent to those skilled in the art from this disclosure that there are also minor differences between the right and left crank arms 14 in that the right crank arm 14 is configured to be coupled to the chain ring plate 18 to support the sprocket 20. However, these differences are not important to the present invention. Therefore, the right and left crank arms 14 will be discussed as if they are identical.

In any event, each of the crank arms 14 has an inner end portion 30, a central body portion 31 and an outer end portion 32. While the crank arms 14 are illustrated as one-piece unitary members, it will be apparent to those skilled in the art from this disclosure that the crank arms 14 can be constructed two or more pieces as needed and/or desired. In fact, the central body portion 31 is constructed of two pieces as disclosed in U.S. Pat. No. 5,988,016 to Yamanaka (assigned to Shimano Inc.). However, for the purposes of illustration, the crank arms 14 will be illustrated as one-piece unitary members.

Figure 7:
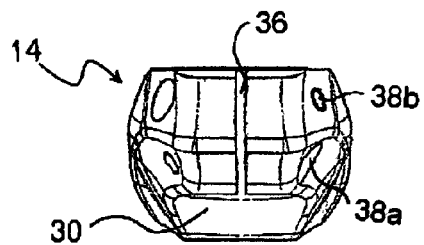
FIG. 7 is a top plan view of the left crank arm illustrated in FIGS. 5 and 6 for the bicycle crank set illustrated in FIGS. 1-3 in accordance with the present invention.
Figure 5:
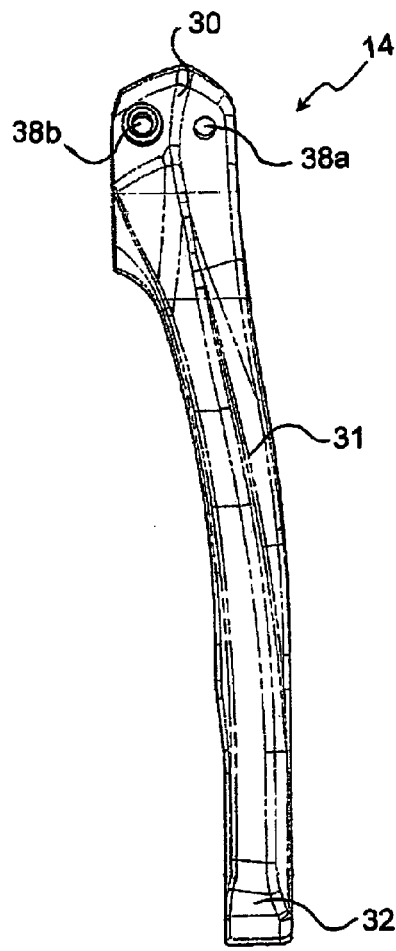
FIG. 5 is a front end elevational view of the left crank arm for the bicycle crank set illustrated in FIGS. 1-3 in accordance with the present invention.
Figure 6:
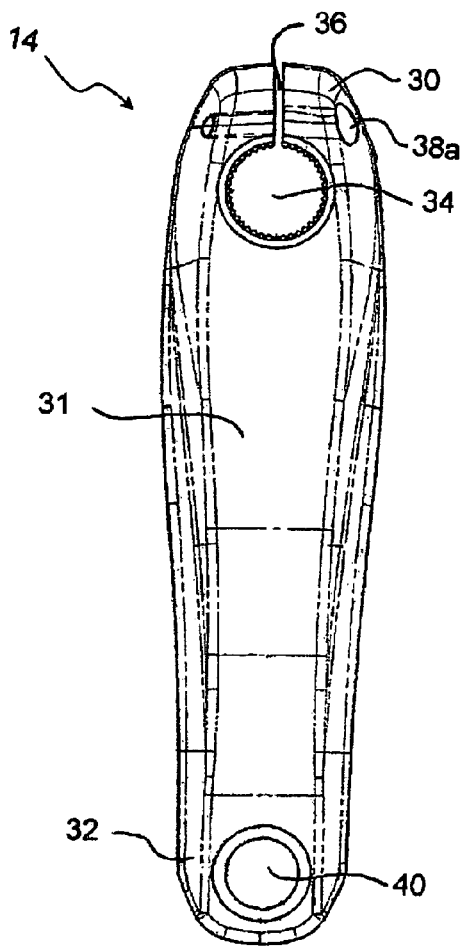
FIG. 6 is an outside elevational view of the left crank arm illustrated in FIG. 5 for the bicycle crank set illustrated in FIGS. 1-3 in accordance with the present invention.
Figure 8:
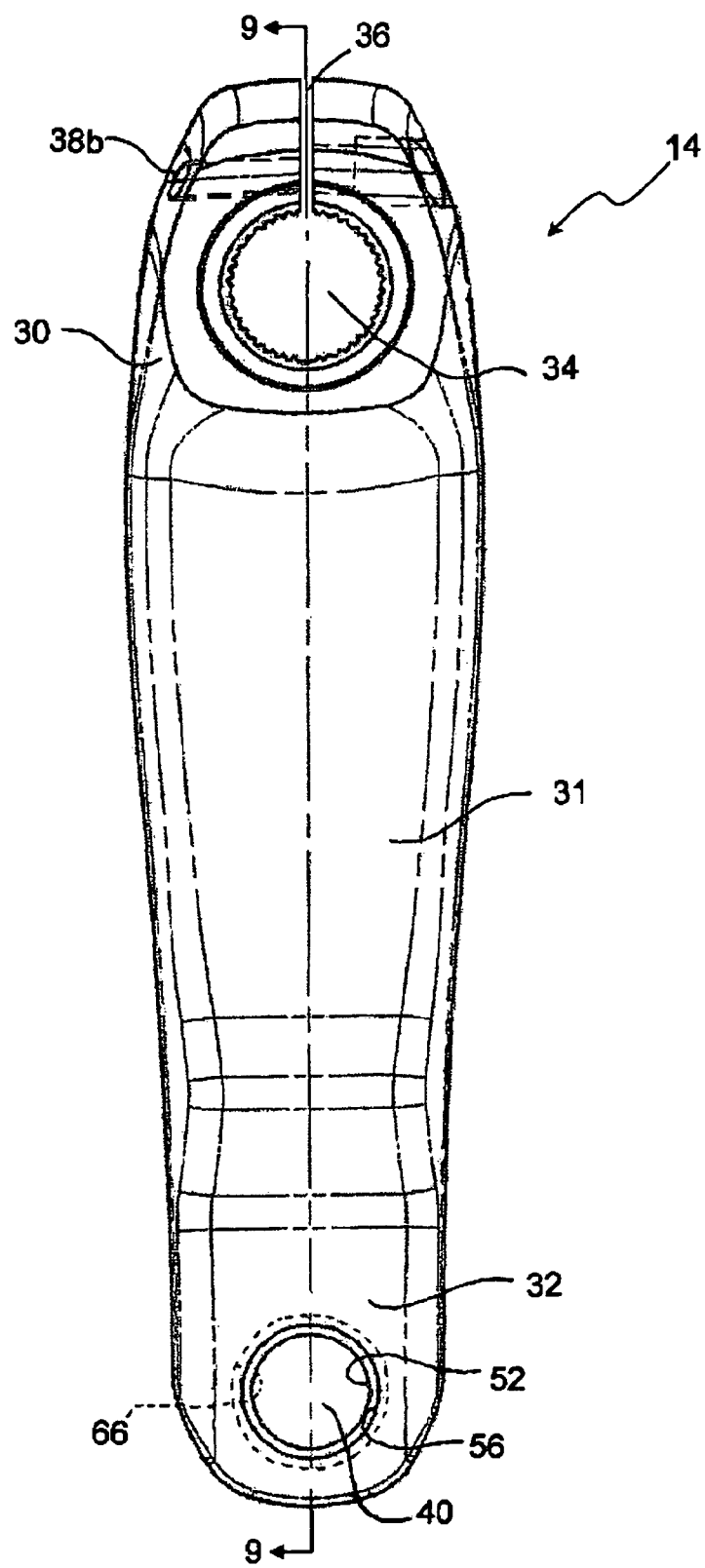
FIG. 8 is an inside elevational view of the left crank arm illustrated in FIGS. 5-7 for the bicycle crank set illustrated in FIGS. 1-3 in accordance with the present invention.

The inner end portion 30 of the crank arm 14 has an axle attachment bore 34 for receiving one of the ends 16a or 16b of the axle 16c of the bottom bracket 16. As best seen in FIGS. 6 and 7, the axial attachment bore 34 is a split bore. In other words, a slot 36 extends axially through the inner end portion 30 so as to intersect longitudinally with the axial attachment bore 34. Moreover, the inner end portion 30 of the crank arm 14 has a pair of transverse fastener holes 38a and 38b to fixedly secure the crank arm 14 to the axle 16c of the bottom bracket 16 via a pair of bolts (not shown). In particular, each of the transverse fastener holes 38a and 38b has stepped shaped portion on one side of the slot 36 and a threaded portion on the other side of the slot 36 as best seen in FIG. 8. The transverse fastener holes 38a and 38b are identical, except that that are facing in opposite directions relative to the slot 36. The transverse fastener holes 38a and 38b extend across the slot 36 for changing the effective diameter of the axial attachment bore 34 to fixedly secure the crank arm 14 to the axle 16c of the bottom bracket 16. The transverse fastener holes 38a and 38b are substantially parallel to each other and lie on a plane that is perpendicular to the slot 36.

Figure 4:
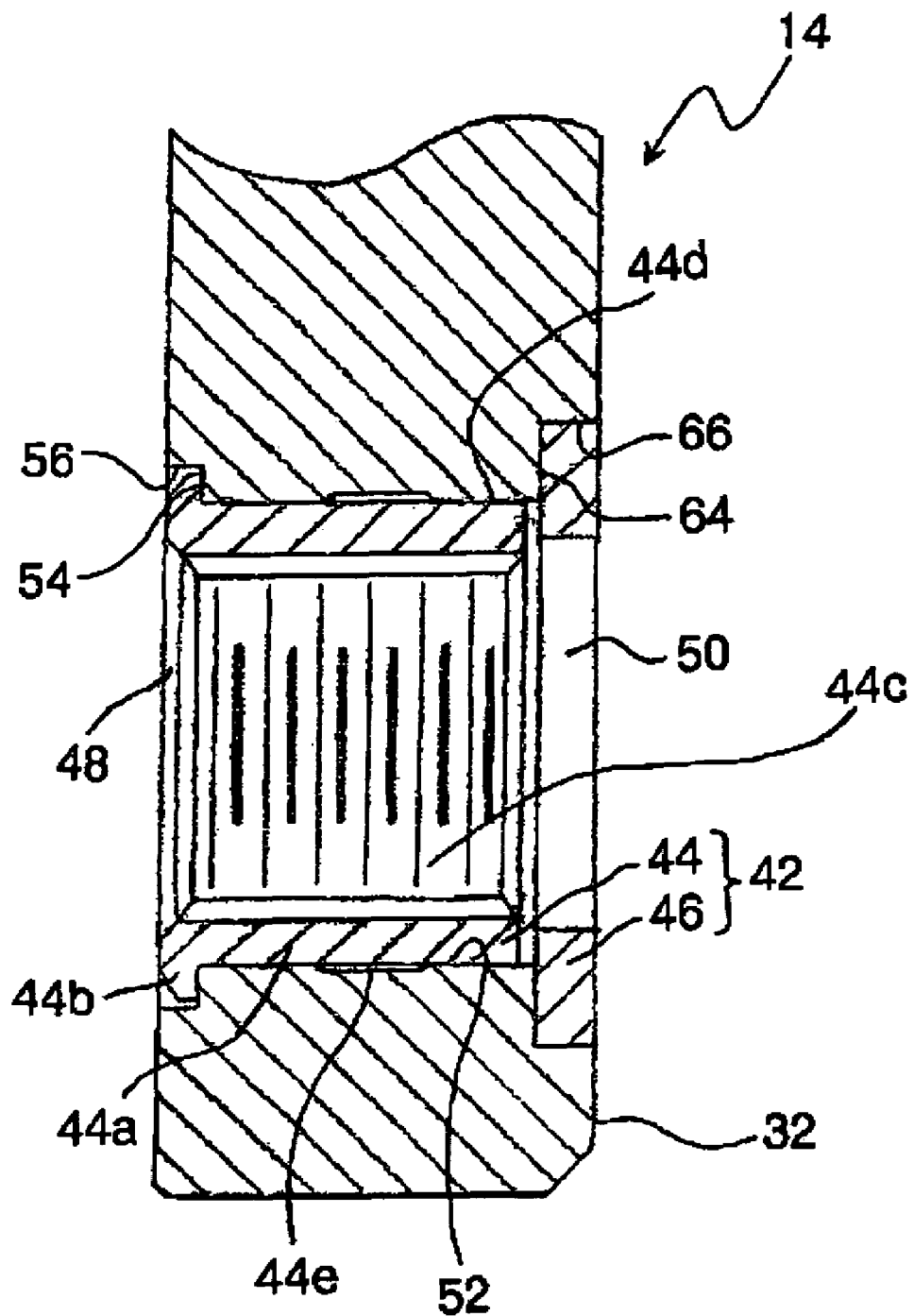
FIG. 4 is an enlarged, partial cross-sectional view of the bottom or outer end of the right crank arm for the bicycle crank set illustrated in FIGS. 1-3 in accordance with the present invention.
Figure 9:
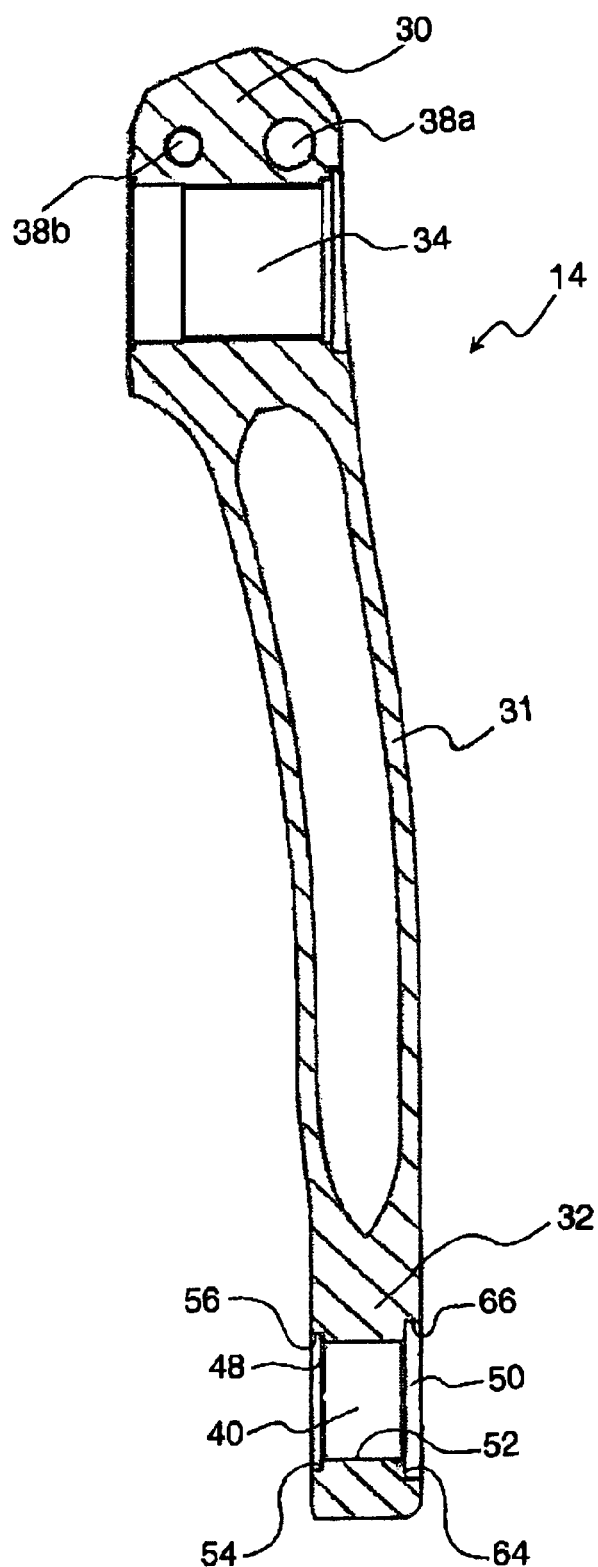
FIG. 9 is a longitudinal cross-sectional view of the left crank arm illustrated in FIGS. 5-8 as seen along section line 9-9 of FIG. 8.
Figure 11:
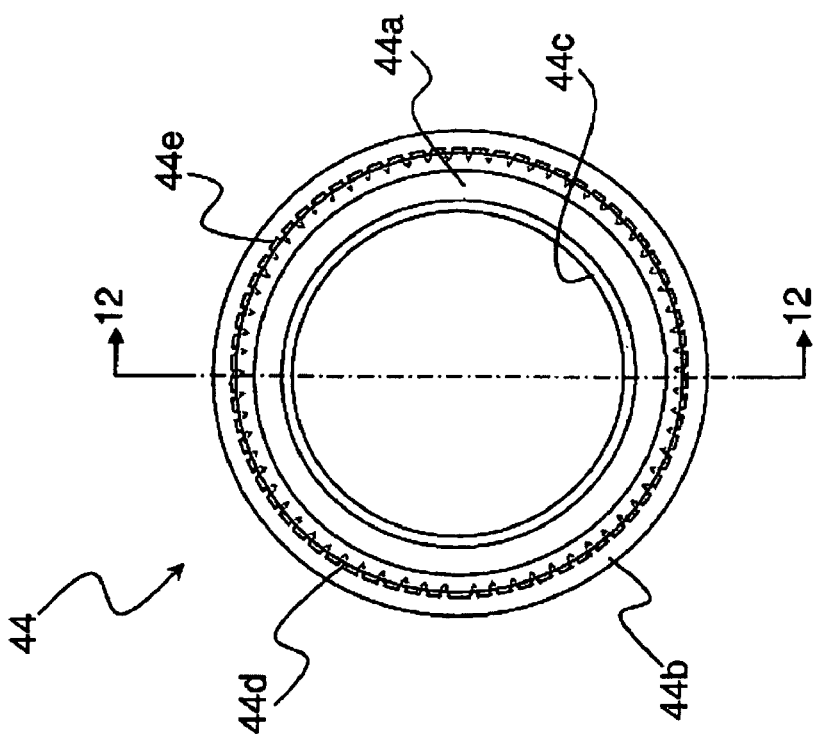
FIG. 11 is an outside end elevational view of the tubular member shown in FIG. 10 for the bicycle crank set illustrated in FIGS. 1-3 in accordance with the present invention.
Figure 10:
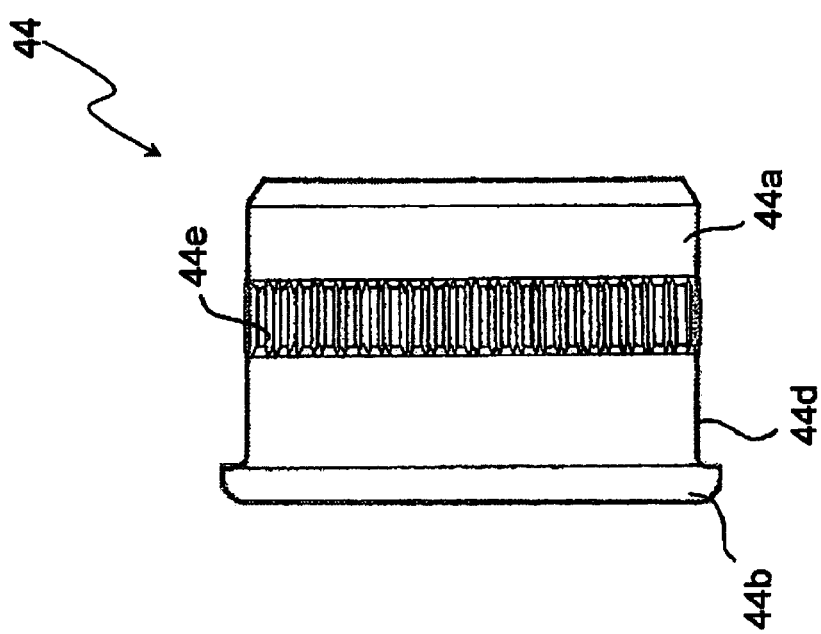
FIG. 10 is a side elevational view of a tubular member of a reinforcement member for the bicycle crank set illustrated in FIGS. 1-3 in accordance with the present invention.
Figure 12:
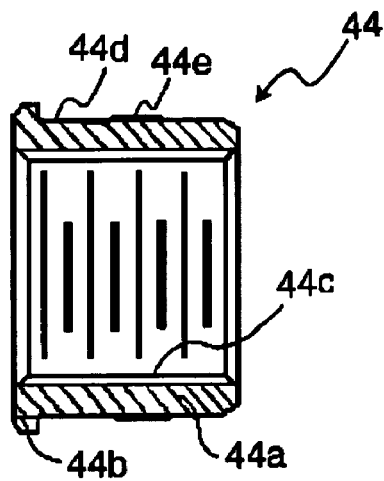
FIG. 12 is a longitudinal cross sectional view of the tubular member illustrated in FIGS. 10 and 11 as seen along the section line 12-12 of FIG. 11 in accordance with the present invention.

As seen in FIGS. 3 and 4, the outer end portion 32 of the crank arm 14 has a pedal attachment bore 40 with a reinforcement member 42 located therein. As discussed below, the reinforcement member 42 includes a bushing or tubular member 44 and a washer 46. As best seen in FIG. 9, the pedal attachment bore 40 has an inside or first counterbore 48, an outside or second counterbore 50 and a cylindrical surface 52 that extends between the first and second counterbores 48 and 50. The first counterbore 48 is located at the inwardly facing axial end of the pedal attachment bore 40. The second counterbore 50 is located at the opposite axial end of the pedal attachment bore 40 from the first counterbore 48. The counterbores 48 and 50 have longitudinal axes that are concentric with the longitudinal axis of the cylindrical surface 52 of the pedal attachment bore 40.

The first counterbore 48 basically includes an abutment surface 54 and a peripheral surface 56, as shown in FIGS. 8 and 9. The abutment surface 54 faces in an axial direction towards the bicycle 10. Thus, the abutment surface 54 extends radially between the cylindrical surface 52 and the peripheral surface 56. Preferably, the peripheral surface 56 is a cylindrical surface that is concentric with the cylindrical surface 52 as best seen in FIG. 8.

The second counterbore 50 is preferably larger than the first counterbore 48. The second counterbore 50 has an abutment surface 64 and a peripheral surface 66. The abutment surface 64 faces in an axial direction away from the bicycle 10. Thus, the abutment surface 64 extends radially between the cylindrical surface 52 and the peripheral surface 66. Preferably, the peripheral surface 66 is a cylindrical surface that is concentric with the cylindrical surface 52 as best seen in FIG. 8.

Referring now to FIG. 4, the reinforcement member 42 basically comprises the tubular member 44 and the washer 46. The tubular member 44 and the washer 46 are preferably made of rigid materials such as steel. As seen in FIG. 4, the tubular member 44 is press fitted into the pedal attachment bore 40, while the washer 46 is located in the second counterbore 50. The washer 46 is sized to overlap the tubular member. However, preferably, the washer 46 does not contact the tubular member 44, at least prior to assembly of the pedal 22 to the crank arm 14 as explained below.

The tubular member 44 basically includes a tubular portion 44a and a mounting flange 44b. The tubular portion 44a includes a first axial end arranged to be disposed adjacent to the first counterbore 48 of the pedal attachment bore 40, and a second axial end arranged to be disposed adjacent to the second counterbore 50 of the pedal attachment bore 40. The mounting flange 44b extends outwardly from the second axial end of the tubular portion 44a. As seen in FIG. 4, the tubular portion 44a is located in the pedal attachment bore 40 and extends substantially the entire axial length of the pedal attachment bore 40. However, preferably an edge of the first axial end of the tubular portion 44a does not extend to the outer edge of the cylindrical surface 52, i.e., an extension surface of the abutment surface 64, so that the tubular portion 44a does not contact the washer 46 at least prior to assembly of the pedal 22 to the crank arm 14. The mounting flange 44b, on the other hand, is located in the first counterbore 48 with the mounting flange 44b contacting the abutment surface 54.

As seen in FIGS. 10-14, the tubular portion 44a has an internal circumferential surface 44c with internal threads extending between the first and second axial ends of the tubular portion 44a. Moreover, the tubular portion 44a has an external circumferential surface 44d extending between the first and second axial ends of the tubular portion 44a. The external circumferential surface 44d has a middle section with axially extending serrations 44e.

Figure 14:
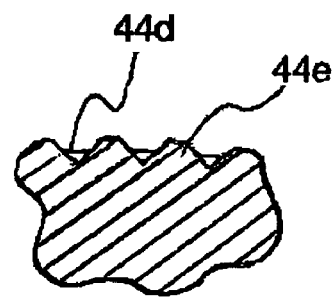
FIG. 14 is a partial enlarged transverse cross-sectional view of the serrations of the tubular member illustrated in FIGS. 10-13 as seen along the section line 14-14 of FIG. 13 in accordance with the present invention.
Figure 13:
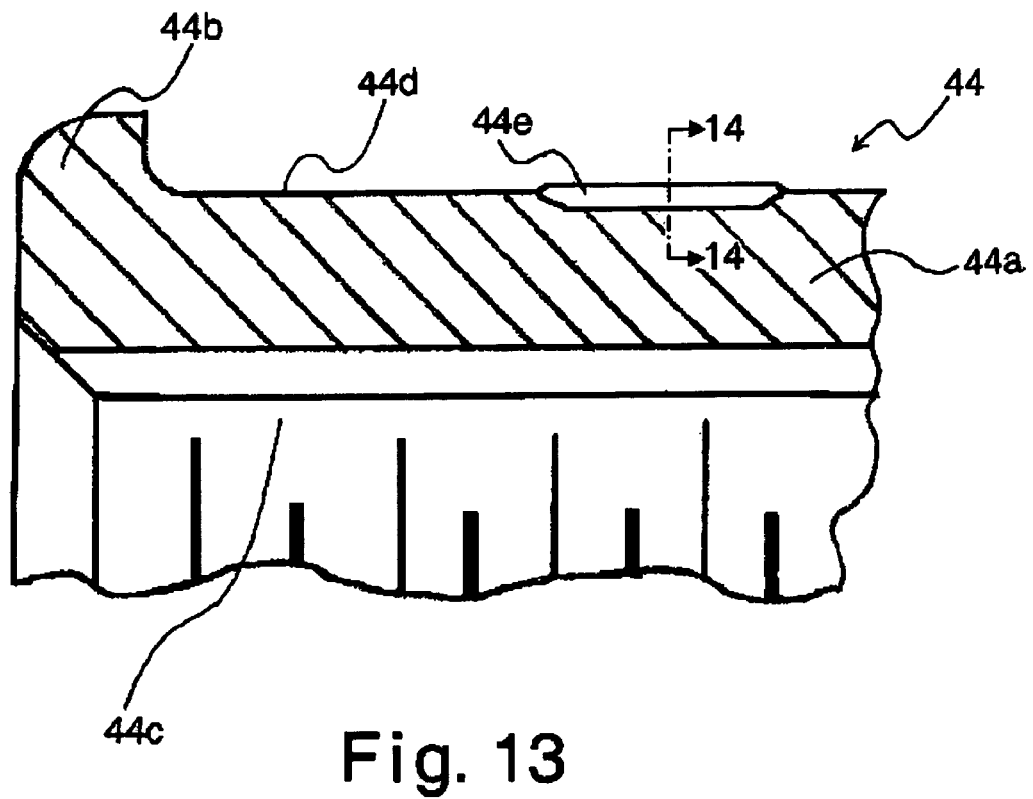
FIG. 13 is an enlarged, partial cross-sectional view of the tubular member illustrated in FIGS. 10-12 in accordance with the present invention.

As best seen in FIGS. 13 and 14, the serrations 44e extend completely around the circumference of the external circumferential surface 44d. Moreover, preferably the axial ends of the serrations 44e are equally spaced from the mounting flange 44b and the other end of the tubular portion 44a. The external circumferential surface 44d preferably has a diameter that is slightly larger than the inner diameter of the cylindrical surface 52 of the pedal attachment bore 40 such that the entire length of the tubular portion 44a is press fitted into the cylindrical surface 52 of the pedal attachment bore 40. The serrations 44e have an even larger outer diameter than the outer diameter of the tubular portion 44a to ensure that the tubular portion 44a is fixed within the cylindrical surface 52 of the pedal attachment bore 40 so as to prevent rotational movement therebetween. More specifically, as seen in FIG. 14, the serrations 44e preferably comprise a plurality of protrusions and a plurality of indentations adjacent to the protrusions. The protrusions outwardly extend from the external circumferential surface 44d by a prescribed length. The indentations inwardly extend from the external circumferential surface 44d by a prescribed length. The prescribed lengths are defined so that the area of the serrations 44e has a diameter that is slightly larger than the diameter or width of the cylindrical surface 52. Thus, the tubular member 44 can be press fitted into the pedal attachment bore 40 so that the tubular member 44 cannot rotate or move axially. In other words, once the tubular member 44 is press fitted into the pedal attachment bore 40, the tubular member 44 cannot be removed, i.e., the tubular member 44 is non-releasably coupled to the crank arm 14. Accordingly, the tubular member 44 is rigidly retained in the pedal attachment bore 40 of the crank arm 14. Moreover, since the tubular member 44 is press fitted into the pedal attachment bore 40, no play exists between the tubular member 44 and the pedal attachment bore 40.

Figure 15:
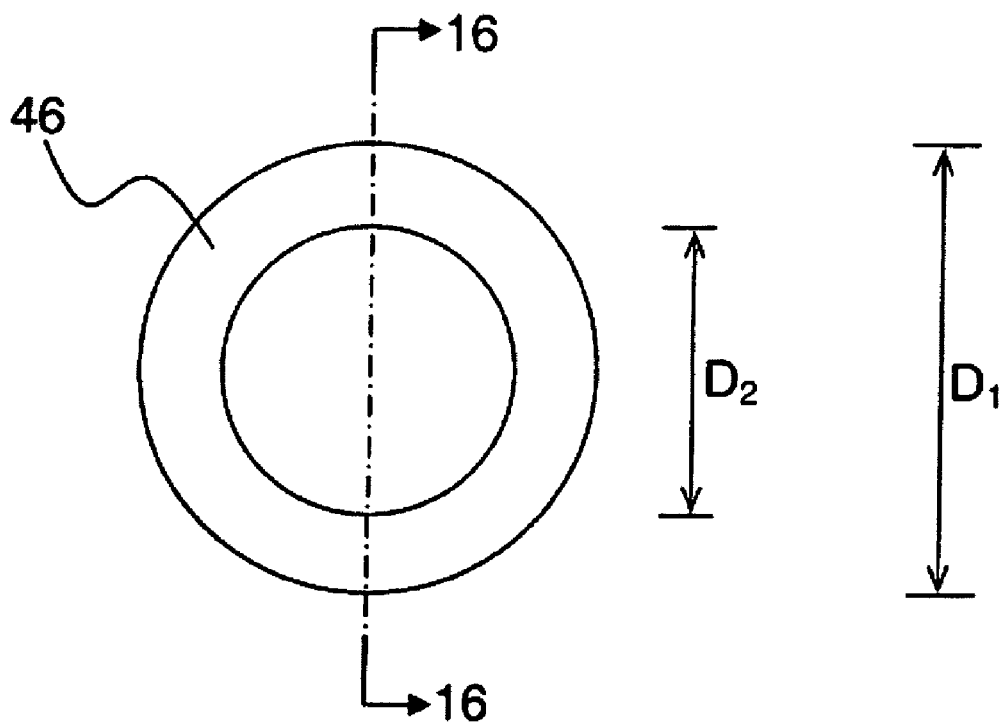
FIG. 15 is an end elevational view of a washer of the reinforcement member for the bicycle crank set illustrated in FIGS. 1-3 in accordance with the present invention.
Figure 16:
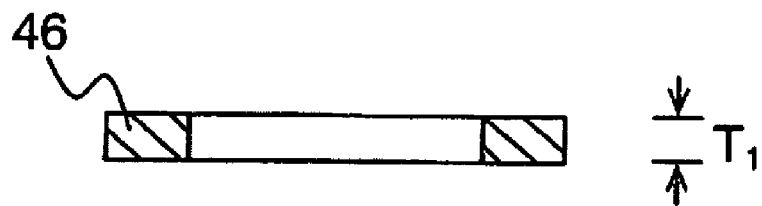
FIG. 16 is a cross-sectional view of the washer illustrated in FIG. 15 as seen along the section line 16-16 of FIG. 15 in accordance with the present invention with the present invention.

Referring now to FIGS. 15 and 16, the washer 46 preferably has a maximum outer diameter or width $D_1$ and an inner diameter or width $D_2$ Preferably, the outer diameter $D_1$ is slightly smaller than the diameter or width of the peripheral surface 66 of the second counterbore 50. The inner diameter $D_2$ of the washer 46 is preferably slightly smaller than the inner diameter or width of the cylindrical surface 52. In other words, the washer 46 preferably fits in the second counterbore 50 and contacts substantially the entire surface of the abutment surface 64. Moreover, preferably, the outer diameter $D_1$ is approximately 24 millimeters and the inner diameter $D_2$ is approximately 15 millimeters such that the radial width of the ring is 4.5 millimeters. Preferably, the washer 46 has a thickness $T_1$ that is substantially equal to the axial length of the peripheral surface 66 of the second counterbore 50.

Figure 17:
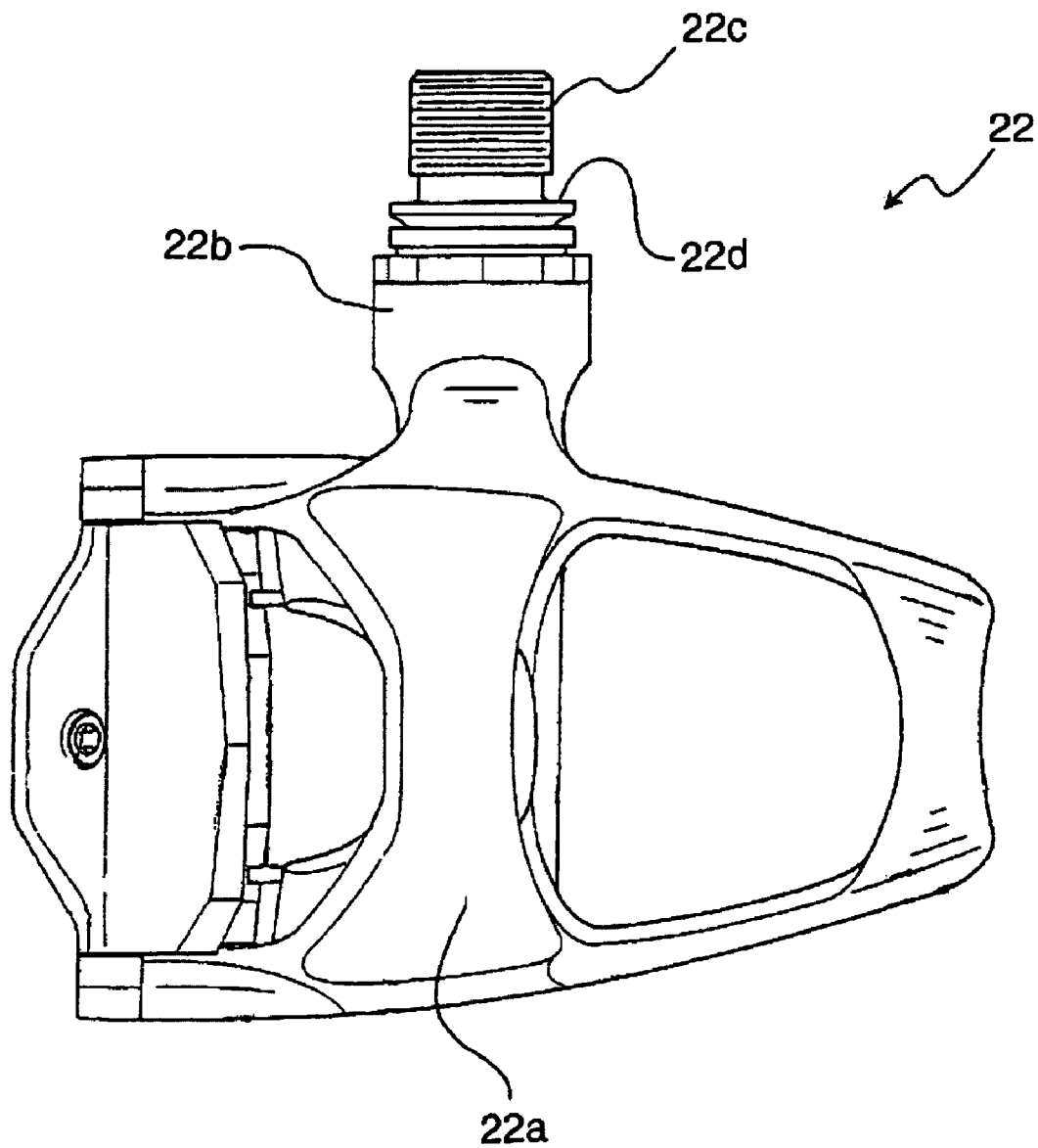
FIG. 17 is a top plan view of a right bicycle pedal for use with the bicycle crank set illustrated in FIGS. 1-3.

Referring now to FIG. 17, a pedal 22 is illustrated for use with the crank arms 14. It will be apparent to those skilled in the art from this disclosure that the right and left pedals 22 are basically identical to each other, except that they are mirror images of each other. Therefore, only one pedal will be discussed or illustrated herein. Basically, the pedal 22 has a pedal body 22a with a pedal shaft 22b extending outwardly from the pedal body 22a. The pedal shaft 22b is rotatably mounted within the pedal body 22a in a conventional manner. The free end of the pedal shaft 22b has threads 22c that match the threads of the internal circumferential surface 44c. The free end of the pedal shaft 22b also has an abutment flange 22d that contacts the washer 46.

When the pedal 22 is attached to the crank arm 14, the washer 46 is arranged to be disposed between the abutment flange 22d of the pedal shaft 22b and the abutment surface 64 of the second counterbore 50. The washer 46 is configured to disperse the stress applied to the outer end portion 32 of the crank arm 14 by the pedal 22 when the external force is applied to the pedal 22. More specifically, when the pedal 22 receives the external force, a part of the external force is imparted to the washer 46 through the abutment flange 22d of the pedal shaft 22b. Since the washer 46 is arranged to contact substantially the entire surface of the abutment surface 64, the part of the external force imparted to the washer 46 is dispersed to substantially the entire surface of the abutment surface 64 through the washer 46. In the present invention, the abutment surface 64 and the washer 46 are arranged to have a larger contacting surface area than in a conventional crank arm assembly. Therefore, the external force imparted from the pedal to the washer 46 is dispersed to the crank arm 14 more efficiently than in the conventional crank arm assembly and thus, the crank arm assembly of the present invention has a larger resistance to the external forces. Accordingly, the crank arm 14 is prevented from being damaged by the external forces imparted from the pedal 22 in the extremely hard riding.

As used herein, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention.

The terms of degree such as "substantially", "about" and "approximately" as used herein mean a reasonable amount of deviation of the modified term such that the end result is not significantly changed. These terms should be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle crank arm assembly, comprising:
   a bicycle crank arm including a first end configured to be coupled to an axle of a bottom bracket and a second end having a bore for receiving a bicycle pedal shaft;
   a tubular member retained in the bore of the bicycle crank arm in a press fit engagement, the tubular member including
      a tubular portion having an external circumferential surface non-releasably retained in the bore of the bicycle crank arm in a press fit engagement and an internal circumferential surface being configured to be coupled to the bicycle pedal shaft, and
      a plurality of serrations formed on the external circumferential surface of the tubular portion, each of the plurality of serrations individually extending as a longitudinal protrusion in an axial direction of the tubular portion to non-rotatably couple the tubular member to the bore of the bicycle crank arm; and
   a washer with an opening being disposed adjacent one axial end of the tubular portion,
   the bore of the second end of the bicycle crank arm being free of serrations formed on and extending from an internal circumferential surface of the bore.

2. The bicycle crank arm assembly as recited in claim 1, wherein
   the plurality of serrations are formed in a middle section of the external circumferential surface of the tubular portion that is axially spaced from first and second axial ends of the tubular portion.

3. The bicycle crank arm assembly as recited in claim 1, wherein
   the internal circumferential surface of the tubular portion includes threads configured to engage with the bicycle pedal shaft.

4. The bicycle crank arm assembly as recited in claim 1, wherein
   the tubular member includes a mounting flange extending outwardly from one axial end of the tubular portion in a direction substantially perpendicular to a center axis of the tubular portion and contacting an outer peripheral area adjacent a first axial end of the bore of the bicycle crank arm.

5. The bicycle crank arm assembly as recited in claim 1, wherein
   the bicycle crank arm includes a counterbore located at one axial end of the bore with the washer disposed in the counterbore.

6. The bicycle crank arm assembly as recited in claim 5, wherein
   the opening of the washer has a maximum width that is larger than a diameter of the internal circumferential surface of the tubular portion and smaller than a diameter of the external circumferential surface of the tubular portion.

7. The bicycle crank arm assembly as recited in claim 6, wherein
   the washer has a maximum width that is larger than the diameter of the external circumferential surface of the tubular portion.

8. The bicycle crank arm assembly as recited in claim 7, wherein
   the counterbore has a maximum radial width that is greater than a maximum width of the bore in a range between 5 mm and 10 mm.

9. The bicycle crank arm assembly as recited in claim 5, wherein
   the washer has a thickness that is substantially equal to an axial depth of the counterbore of the bore of the bicycle crank arm.

10. The bicycle crank arm assembly as recited in claim 1, wherein
    the opening of the washer has a maximum width that is larger than a diameter of the internal circumferential surface of the tubular portion and smaller than a diameter of the external circumferential surface of the tubular portion.

11. The bicycle crank arm assembly as recited in claim 10, wherein
    the washer has a maximum width that is larger than the diameter of the external circumferential surface of the tubular portion.

12. The bicycle crank arm assembly as recited in claim 1 wherein
    the external circumferential surface of the tubular portion and the internal circumferential surface of the tubular portion are concentric with one another.

* * * * *